(12) United States Patent
Pfeifer et al.

(10) Patent No.: US 8,769,693 B2
(45) Date of Patent: Jul. 1, 2014

(54) TRUSTED INSTALLATION OF A SOFTWARE APPLICATION

(75) Inventors: William Pfeifer, Redmond, WA (US); Joseph Johnson, Seattle, WA (US); Ronald Thompson, Monroe, WA (US); Ajith Kumar, Seattle, WA (US); Nitin Sood, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/350,816

(22) Filed: Jan. 16, 2012

(65) Prior Publication Data

US 2013/0185799 A1    Jul. 18, 2013

(51) Int. Cl.
*G06F 12/14* (2006.01)
*G06F 12/16* (2006.01)
*G08B 23/00* (2006.01)

(52) U.S. Cl.
USPC ............... 726/24; 726/22; 726/23; 726/25

(58) Field of Classification Search
USPC ............................................. 726/22–25
See application file for complete search history.

(56) References Cited

U.S. PATENT DOCUMENTS

| | | | |
|---|---|---|---|
| 2003/0093508 A1* | 5/2003 | Li et al. | 709/222 |
| 2006/0130144 A1* | 6/2006 | Wernicke | 726/24 |
| 2006/0212925 A1 | 9/2006 | Shull et al. | |
| 2006/0230451 A1* | 10/2006 | Kramer et al. | 726/22 |
| 2007/0016953 A1* | 1/2007 | Morris et al. | 726/24 |
| 2007/0079364 A1* | 4/2007 | Abels et al. | 726/10 |
| 2008/0155642 A1 | 6/2008 | Schackow et al. | |
| 2009/0249064 A1 | 10/2009 | De Atley et al. | |
| 2010/0058468 A1 | 3/2010 | Green et al. | |
| 2010/0313035 A1* | 12/2010 | Turbin et al. | 713/189 |

OTHER PUBLICATIONS

Buenaventura, Donna, "Norton Internet Security 2011 Guide", Retrieved at <<http://www.brighthub.com/computing/smb-security/articles/107277.aspx>>, Retrieved Date: Oct. 7, 2011, pp. 4.

"McAfee VirusScan Enterprise 8.8", Retrieved at <<https://kc.mcafee.com/resources/sites/MCAFEE/content/live/PRODUCT_DOCUMENTATION/22000/PD22940/en_US/vse_880_best_practices_guide.pdf>>, Retrieved Date: Oct. 10, 2011, pp. 1-42.

(Continued)

*Primary Examiner* — Joseph P. Hirl
*Assistant Examiner* — Kalish Bell
(74) *Attorney, Agent, or Firm* — Henry Gabryjelski; Kate Drakos; Micky Minhas (57) ABSTRACT

The trust reputation of the combination of an installation package and installer, as a pair, and the combination of a file and an installer, as a pair, is used to store the identity of a file in a persistent cache. An entry in the persistent cache indicates the trust worthiness of a file that does not contain malware thereby avoiding a scan of the file for malware. The trust worthiness of a file may be determined from known trust reputations of the installation package, installer, and file from a network of computing resources. By relying on the known trust reputation of the combination of the installation package and installer and the combination of the file and installer, the identity of the file may be stored in persistent cache quickly.

20 Claims, 6 Drawing Sheets

(56) References Cited

OTHER PUBLICATIONS

Hwang, et al., "Cloud Security with Virtualized Defense and Reputation-Based Trust Mangement", Retrieved at <<http://ieeexplore.ieee.org/stamp/stamp.jsp?tp=&arnumber=5380613>>, Proceedings of the 8th IEEE International Conference on Dependable, Autonomic and Secure Computing (DASC), Dec. 12-14, 2009, pp. 717-722.

"Managing Symantec Endpoint Protection in virtual environments", Retrieved at <<http://www.symantec.com/business/support/index?page=content&id=HOWTO55356>>, Jun. 29, 2011, pp. 4.

* cited by examiner

TRUSTED INSTALLATION OF A SOFTWARE APPLICATION

BACKGROUND

An anti-malware program aims to detect, prevent, and remove malicious code from executing on a computing device and creating unwanted consequences. Malware or malicious code may take the form of a computer virus, computer worm, spyware, adware, a Trojan horse, and so forth. The anti-malware program may scan every file whenever a file is created, opened, and closed. The file may be scanned against a database having hundreds of known malware programs.

An installation package is a set of files that is assembled in a particular format for installation onto a computing device. The installation package may include files, metadata, libraries, etc. When the files from an installation package are installed on a computing device, the anti-malware program typically scans each file in the installation package against the database of known malware programs to determine if any of the files contains a known malware program. The process of scanning each file may consume an enormous amount of time especially if the installation package contains a large number of files or the malware database contains a large number of known malware programs. A long scanning time slows down the installation of the package and degrades the overall system performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An anti-malware driver may avoid scanning one or more files by relying on the trust reputation of the installation package and installer, as a pair, and the trust reputation of the installer and file, as a pair. Typically, the installation of one or more files contained in an installation package may not be stored in a persistent cache until the anti-malware driver has scanned the files for malware. A persistent cache may be used to store the identity of files that may not contain malware and which avoid the additional step of being scanned for malware. By relying on the trust reputation of the installation package and installer, as a pair, and the trust reputation of the installer and file, as a pair, the identity of a file may be stored in persistent cache sooner thereby making the file accessible to a user more readily.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a trusted installation of files onto a computing device in a manner that makes the files more readily accessible to a user. A trust reputation associated with an installation package and an installer, as a pair, and an installer and a file, as a pair, may be used to determine that a file is deemed trusted and does not contain malware. The identity of the file may then be stored in persistent cache. A persistent cache is used to identify files having a trust reputation thereby considering the file as trusted and not containing malware. A file identified by the persistent cache avoids being scanned for malware.

Installation refers to the process of copying one or more files from an installation package into a file system. An installer is a program that when executed installs or copies the files of the installation package into the file system. The installer may be an executable file that may be part of an installation package. An installation package may contain malware. Furthermore, the installer may download files that may contain malware or the installer may spawn off a process that downloads files, possibly containing malware, onto a computing device. These scenarios may occur during the installation of a software application and are considered by an anti-malware driver during the installation of an installation package.

The trust reputation of an installation package, installer and file may be determined by searching a trust list stored locally on the computing device. The trust list may contain the identity of known trusted installation packages, installer, and files. Alternatively, the trust reputation of an installation package, installer, and file may be determined through trust reputation information provided by a trust service hosted by a trust server connected to the computing device. The trust server may aggregate trust reputation information from multiple computing devices. The trust reputation of an installation package may also be determined from a digital certificate associated with the publisher of the installation package. Attention now turns to a more detailed description of the embodiments.

Figure 1:
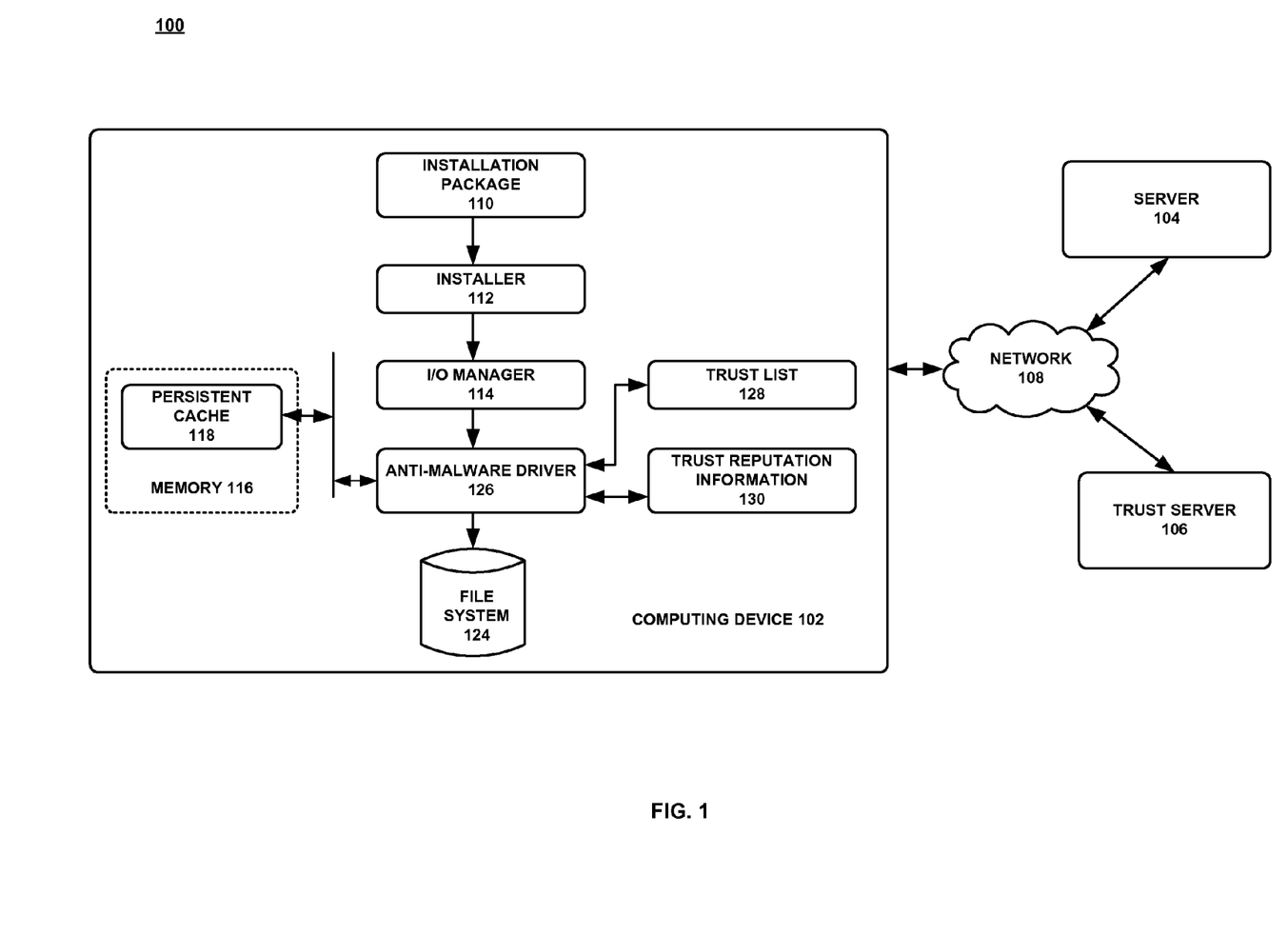
FIG. 1 illustrates an exemplary system that utilizes a trusted installation of a software application.

FIG. 1 illustrates a block diagram of an exemplary system 100 for performing a trusted installation of an installation package. The system 100 may include a computing device 102, a server 104, and a trust server 106 communicatively coupled through a network 108. Although the system 100 as shown in FIG. 1 has a limited number of elements in a certain topology, it may be appreciated that the system 100 may include more or less elements in alternate topologies as desired for a given implementation.

The computing device 102, the server 104, and the trust server 106 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The network 108 may be any type of communications link capable of facilitating communications between the computing device 102, the server 104, and the trust server 106, utilizing any communications protocol and in any configuration, such as without limitation, a wired network, wireless network, or combination thereof. It will be appreciated that the network connections shown are exemplary and other means of establishing a communications link between the computing device 102 and the servers 104, 106 may be used as well.

The computing device 102 may include an installation package 110 that may need to be installed on the computing device 102. An installation package 110 is a set of files that is assembled in a particular format. For example, a Windows-based computing system may receive an .msi file which is an installation package formatted for a Windows installer program (i.e., msiexec.exe). The installation package may be a zip container (e.g., .zip file) that may be installed through an extraction program (e.g., explorer.exe). The installation package 110 may include files, metadata, libraries, executables, an installer program, etc. The installation package 110 may have been retrieved from a computer-readable medium, a network, and the like.

An installer 112 is a software application that may be utilized to install the installation package 110 onto the computing device 102. The installer 112 may be part of the computing system's operating system, assembled as part of the installation package, or a stand-alone executable program. The installer 112 may utilize an input output (I/O) manager 114 to open and create the files that are stored onto the computing device 102.

A persistent cache 118 may be used to store the identity of one or more files that are deemed to be trusted and having a trust reputation. The files identified in the persistent cache 118 are deemed to not contain malware. The persistent cache 118 may be stored in a memory 116 that may include may be any type of memory device (e.g., random access memory, read-only memory, etc.), magnetic storage, volatile storage, non-volatile storage, optical storage, DVD, CD, floppy disk drive, and the like. The memory 116 may also include one or more external storage devices or remotely located storage devices. The data in the persistent cache 118 is not lost and survives a system reboot. The data in the persistent cache 118 may be written back to a hard disk or other type of permanent storage device so that the data remains in perpetuity.

The computing device 102 may include a file system 124 that stores and maintains the physical locations of the files. The file system 124 interacts with the I/O manager 114 through an anti-malware driver 126. The anti-malware driver 126 intercepts file commands issued by the I/O manager 114 to perform malware prevention tasks. For example, the anti-malware driver 126 may intercept a file open command to scan the files within an installation package 110 for malware prior to storing the files contained in the installation package into the file system 124.

The anti-malware driver 126 may utilize a locally-stored trust list 128 that contains the identity of installation packages, installers, and files having a trust reputation. A trust reputation is indicative of the installation package, installer, and/or file not containing malware, in whole or in part. Alternatively, the anti-malware driver 126 may obtain trust reputation information 130 pertaining to an installation package, installer, and/or file from a trust server 108. The trust server 108 may contain trust reputation information 130 pertaining to the installation packages, installers, and files known to be trusted from a consortium of reliable computing devices.

The anti-malware driver 126 may be a sequence of computer program instructions, that when executed by a processor, causes the processor to perform methods and/or operations in accordance with a prescribed task. The anti-malware driver 126 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner The various elements of system 100 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

Attention now turns to a discussion of operations for the embodiments that may be described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
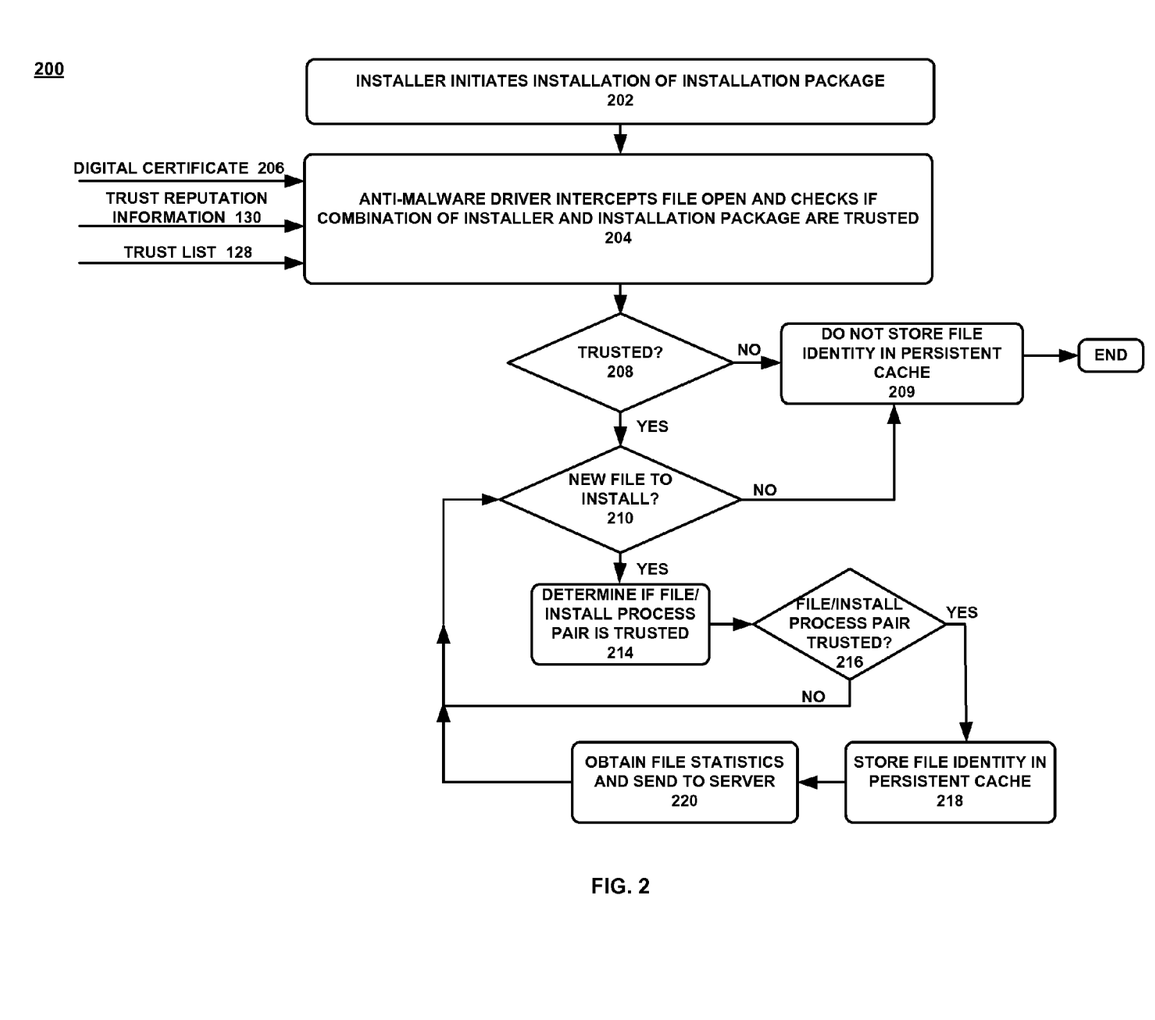
FIG. 2 is a flow diagram illustrating a first exemplary method of a trusted installation.

FIG. 2 illustrates a flow diagram of an exemplary method 200 for installing an installation package 110 of a software application. It should be noted that the method 200 may be representative of some or all of the operations executed by one or more embodiments described herein and that the method can include more or less operations than that which is described in FIG. 2.

Referring to FIG. 2, an installation package 110 is received which requires installation on a computing device 102 (block 202). The installation package 110 may have been read in from a computer-readable medium, downloaded from a network, and so forth (block 202). The installer 112 may be executed to initiate the installation (block 204). The installer 112 may be a software application that is part of the computing device's operating system (block 204). For example, for a Windows-based operating system, the msiexec.exe program may be used as the installer for .msi packaged files. The installer 112 may invoke the I/O manager 114 to open the installation package 110 (e.g., file open command). The anti-malware driver 126 intercepts the file open command to initiate malware detection processing to determine whether the combination of the installation package 110 and the installer 112 is trusted (block 204).

In several embodiments, the anti-malware driver 126 may utilize a digital certificate 206 appended to the installation package 110 to determine whether the installation package 110 is trusted. An installation package 110 may be digitally signed using a private key associated with the digital certificate 206 that is appended with the installation package 110.

The anti-malware driver 126 may determine that the installation package 110 is trusted by searching for the identity of the installation package 110 and the installer 112 in a trust list 128. The digital certificate 206 may be used to identify the installation package 110 in the trust list 128. If the combination of the installer 112 and the installation package 110, as a pair, are found in the trust list 128, then the installation package 110 is deemed to have a trust reputation and thereby trusted.

In other embodiments, the anti-malware driver 126 may engage the service of the trust server 108 to determine if the combination of the installer 112 and the installation package 110 is trusted. The computing device 102 may transmit a hash key representing the installation package 110 and another hash key representing the installer 112 to the trust server 108 for the trust server 108 to determine if the combination is trusted (block 204). The trust server 108 determines whether or not the pair is trusted and provides the computing device 102 with the trust reputation information 130 of the pair. The hash key may represent the contents of a file or another representation that uniquely identifies a file (e.g., installation package, installer, etc.).

If the anti-malware driver 126 determines that the combination of the installer 112 and the installation package 110 is not trusted (block 208-no), then the process ends and the identity of the installer 112 and installation package 110 is not stored in the persistent cache 118 (block 209). Otherwise, if the anti-malware driver 126 determines that the combination of the installer 112 and the installation package 110 is trusted (block 208-yes), then each file that the installer 112 attempts to install (block 210-yes) is analyzed for its trust reputation. In some cases, the installer 112 may have spawned off another process or imported additional files that were not part of the original installation package. In either case, the anti-malware driver 126 needs to check the trust worthiness of the current process attempting to install a file and the file being installed. This is done by determining the trust reputation of the combination of the installer 112 and the file, as a pair (block 214). The anti-malware driver 126 may utilize a locally-stored trust list 128 or utilize the services of a trust server 108 as noted above. The identity of the installer may be checked against the installer associated with the installation package. For example, if the installer has the same process identifier as the trusted installer associated with the installation package 110 or is affiliated with a trusted installer (e.g., child process of a parent process that is a trusted installer process), then it may be presumed that the installer is trusted.

If the combination of the installer and file, as a pair, is deemed not trusted (block 216-no), then the identity of the file is not stored in the persistent cache 118 and the next file is analyzed (block 210). If the combination of the installer and file, as a pair, is trusted (block 216-yes), then the identity of the file is stored in the persistent cache 118 (block 218). In addition, file statistics may be collected and sent to the trust server 106 (block 220). The file statistics may include information pertaining to the installation package, installer and file, such as a hash key of the file, a hash key of the installer, the file name of the file, the file name of the installer, the digital certificate of the associated installation package, the number of files contained in the installation package, the size of the files in the associated installation package, and so forth (block 220). The process continues with blocks 210-220 for each file that the installer attempts to install until there are no more files (block 210-no).

Figure 3A:
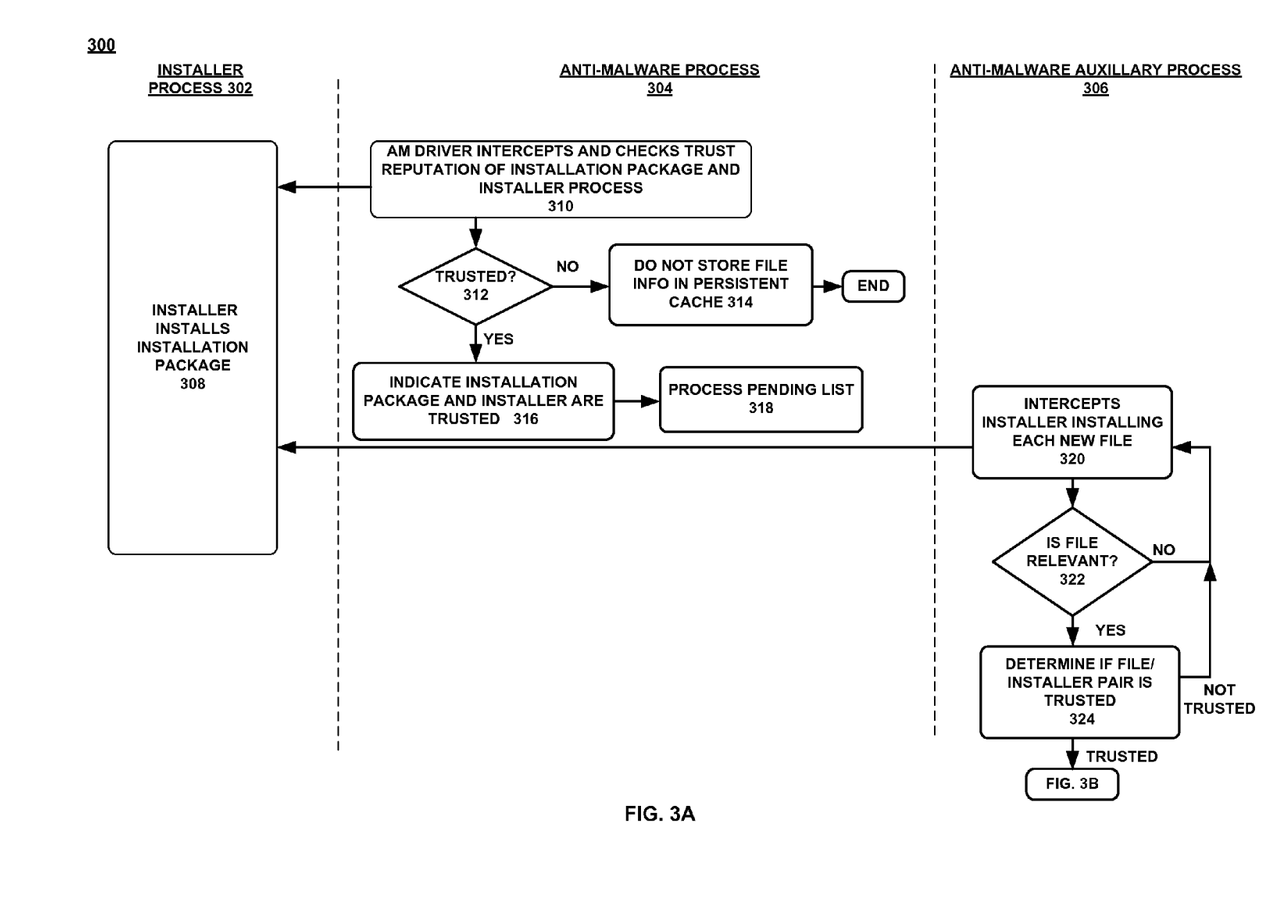
FIGS. 3A-3B are flow diagrams illustrating a second exemplary method of a trusted installation.
Figure 3B:
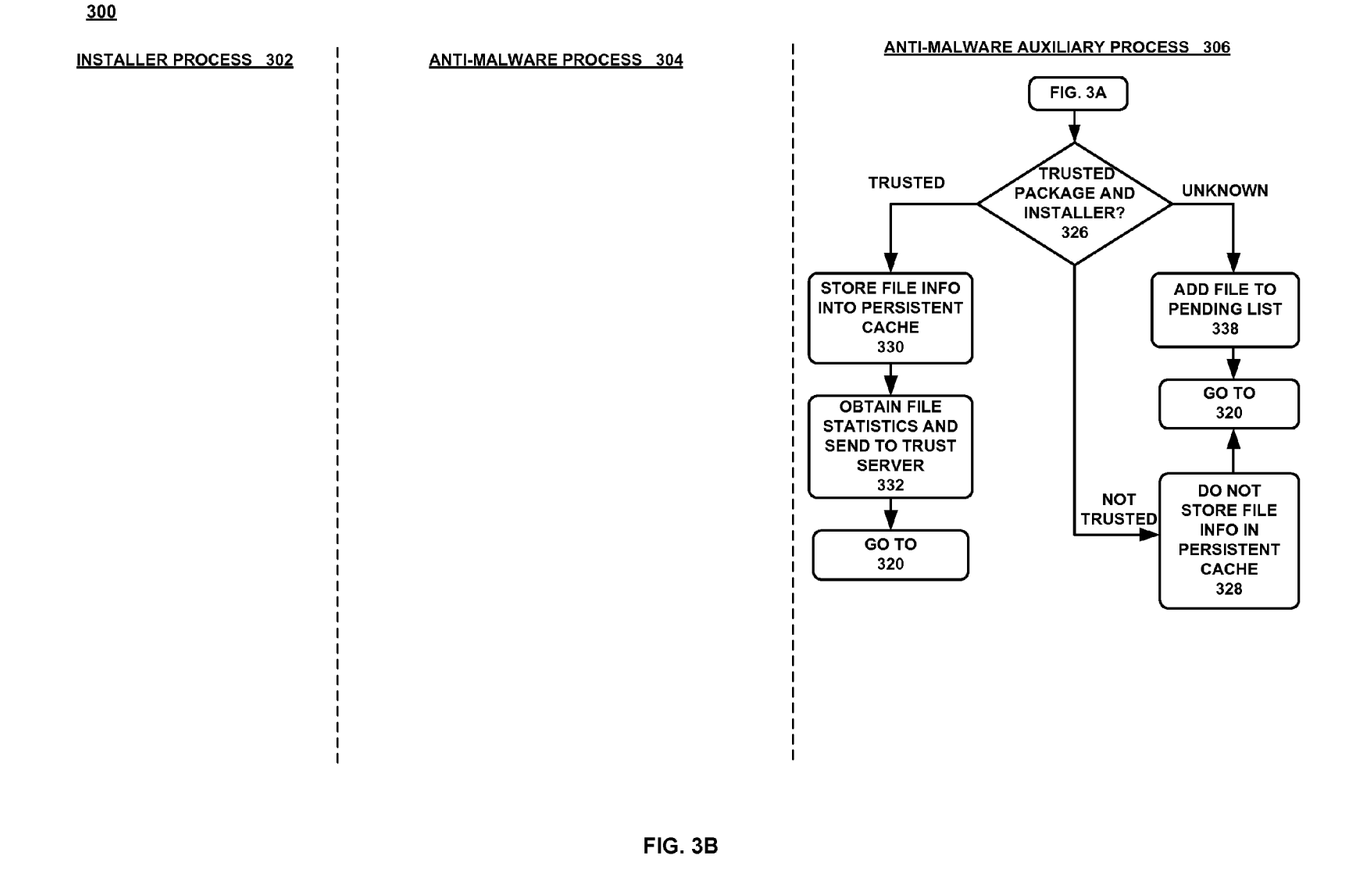

Referring to FIGS. 3A-3B, there is shown another exemplary method 300 for analyzing the trust reputation of an installation package. The method 300 may be performed by three processes, such as an installer process 302, an anti-malware process 304, and an anti-malware auxiliary process 306. A process is an instance of an application that is configured with the resources needed to execute it. A process may contain one or more threads. A thread is an independent execution unit that executes a subset of the application's instructions or code. An installer process 302 may be an instance of the installer 112 executing on a computing device 102, the anti-malware process 304 may be an instance of the anti-malware driver 126 executing on a computing device 102, and the anti-malware auxiliary process 306 may be a process or thread that is spawned off by the anti-malware process 304 to execute a particular set of tasks.

Initially, the installation package 110 is received which requires installation on a computing device 102 (block 308). An installer process 302 performs the installation (block 308). The anti-malware driver process 304 intercepts a file open to initiate malware detection processing by determining whether or not the combination of the installation package 110 and the installer process 302, as a pair, have a trust reputation (block 310). As noted above with respect to FIG. 2, the anti-malware driver 126 may utilize a digital certificate 206 appended to the installation package 110, a trust list 128, trust reputation information 130 from a trust server 106, or another similar mechanism to determine whether the combination of the installation package 110 and the installer process 302 have a trust reputation (block 310).

If the combination of the installation package 110 and installer process 302 do not have a trust reputation and are not trusted (block 312-no), then the method ends and the file information pertaining to the installation package and its file is not stored in the persistent cache 118 (block 314). The anti-malware driver 126 may scan the files associated with the installation package 110 for malware at a later time.

Otherwise, if the combination of the installation package 110 and the installer process 302, as a pair, have a trust reputation (i.e., trusted) (block 312-yes), then the installation package 110 and the installer process 302 are deemed trusted (block 316). The anti-malware process 304 may then process files waiting to be scanned which are stored in a pending list (block 318).

In some instances, the determination of whether the installation package 110 and installer 112, as a pair, have a trust reputation may consume a considerable amount of time. In order to expedite processing, the anti-malware process 304 may spawn off an anti-malware auxiliary process 306 to intercept the installer process 302 when each file is being installed into the file system. For each file that the installer process 302 installs or copies into the file system 124 (block 320), the anti-malware auxiliary process 306 determines if the file is relevant (block 322). A file is relevant if the file is being installed by the installer process 302 or a process spawned from the installer process 302. The check to determine if the file is relevant is performed to ensure that the file was not downloaded from a malware process. If the file is not relevant (block 322-no), then the file information is not placed in persistent cache 118 and the anti-malware auxiliary process 306 waits for the next file that the installer process 302 installs in the file system 124 (block 320).

If the file is relevant (block 322-yes), then the anti-malware auxiliary process 306 determines if the combination of the file and the installer process 302, as a pair, are trusted (block 324). As noted above with respect to FIG. 2, the trust reputation of the combination of the file and the installer process 302, as a pair, may be determined from a trust list 128 and trust reputation information from a trust server 106 (block 324). If the combination of the file and the installer process 302, as a pair, is not trusted (block 324-not trusted), then the file information is not stored in persistent cache 118 and the anti-malware auxiliary process 306 waits for the next file that the installer process 302 installs in the file system 124 (block 320).

If the combination of the file and the installer process 302, as a pair, is trusted (block 324-trusted), then the anti-malware auxiliary process 306 determines if the installation package 110 and the installer process 302 are trusted (block 326). The determination of whether or not the installation package 110 and the installer process 302 are trusted may be performed by the anti-malware process 304 in block 310. When the anti-malware process 304 completes the determination, the results may be posted in the trust list 128 or another data structure that the anti-malware auxiliary process 306 is able to access.

In the event the installation package 110 and the installer process 302 is not trusted (block 326), then the file information pertaining to the file is not stored in the persistent cache 118 (block 328) and the anti-malware auxiliary process 306 waits for the next file that the installer process 302 installs in the file system 124 (block 320).

In the event the installation package 110 and the installer process 302 are not known to be trusted (block 326-unknown), then the file may be added to a pending list (block 338) and the anti-malware auxiliary process 306 waits for the next file that the installer process 302 installs in the file system 124 (block 320). It may be the case that the anti-malware process 304 may not have completed processing the trust reputation of the installation package 110 and the installer process 302 and until this processing is completed (step 310), the file is kept on a pending list. At a later point in time, the anti-malware process 304 may scan the file for malware.

If the installation package 110 and the installer process 302 are determined to be trusted (block 326-trusted), then the file information pertaining to the installer process 302 and file is stored in the persistent cache 118 (block 330). The file statistics may be obtained and sent to a trust server 106 (block 332) as noted above with respect to FIG. 2. The anti-malware auxiliary process 306 waits for the next file that the installer process 302 installs in the file system 124 (block 320).

Figure 4:
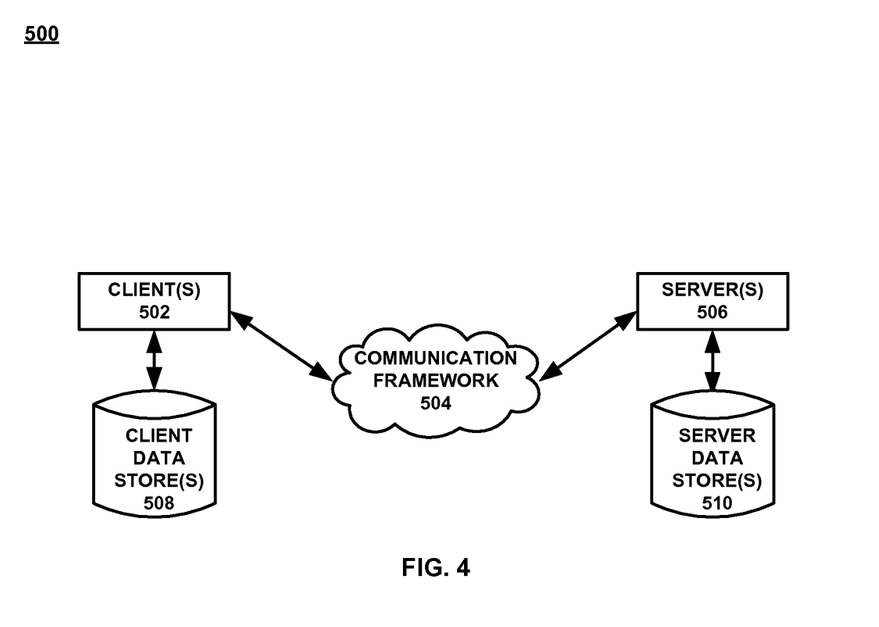
FIG. 4 is a block diagram illustrating an operating environment.

Attention now turns to a discussion of an exemplary operating environment. FIG. 4 illustrates a first operating environment 500. It should be noted that the operating environment 500 is exemplary and is not intended to suggest any limitation as to the functionality of the embodiments. The embodiment may be applied to an operating environment 500 having one or more client(s) 502 in communication through a communications framework 504 with one or more server(s) 506. The operating environment 500 may be configured in a network environment, a distributed environment, a multiprocessor environment, or as a stand-alone computing device having access to remote or local storage devices.

A client 502 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 502 may also be embodied as a software module having instructions that execute in a single execution path, multiple concurrent execution paths (e.g., thread, process, etc.), or in any other manner A server 506 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 506 may also be embodied as a software module having instructions that execute in a single execution path, multiple concurrent execution paths (e.g., thread, process, etc.), or in any other manner The communications framework 504 facilitates communications between the client 502 and the server 506. The communications framework 504 may embody any type of communications medium, such as wired or wireless networks, utilizing any communication protocol. Each client(s) 502 may be coupled to one or more client data store(s) 508 that store information local to the client 502. Each server(s) 506 may be coupled to one or more server data store(s) 510 that store information local to the server 506.

Figure 5:
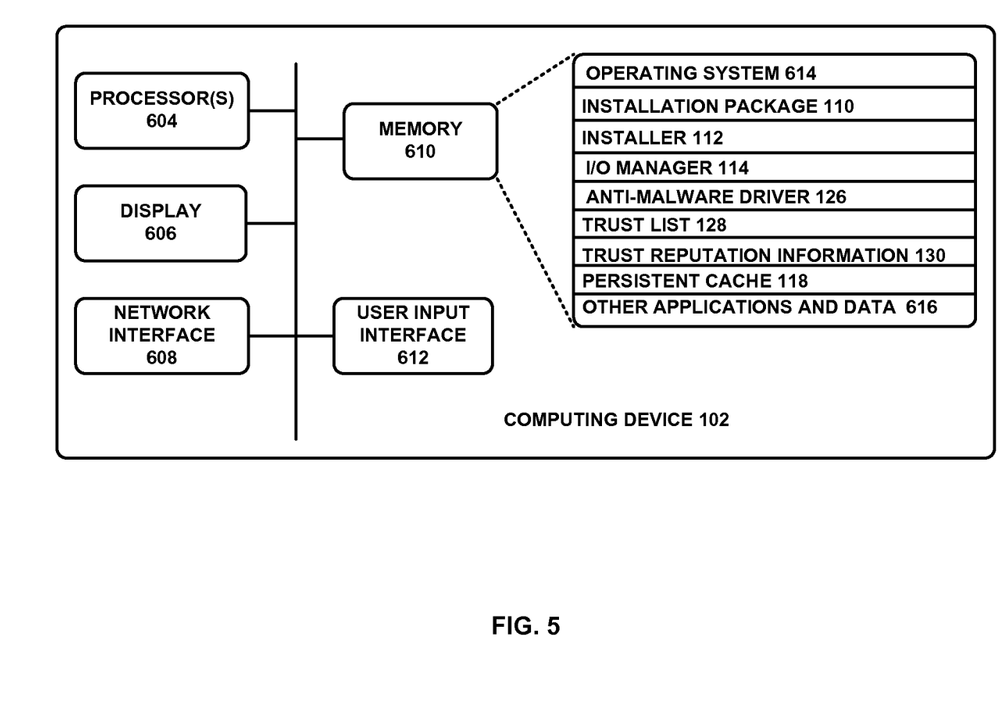
FIG. 5 is a block diagram illustrating an exemplary computing device.

FIG. 5 illustrates a block diagram of an exemplary computing device 102. The computing device 102 may have one or more processors 604, a display 606, a network interface 608, a memory 610, and a user input interface 612. A processor 604 may be any commercially available processor and may include dual microprocessors and multi-processor architectures. The display 606 may be any visual display unit. The network interface 608 facilitates wired or wireless communications between the computing device 102 and a communications framework. The user input interface 612 facilitates communications between the computing device 102 and input devices, such as a keyboard, mouse, etc.

The memory 610 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 610 may also include one or more external storage devices or remotely located storage devices. The memory 610 may contain instructions and data as follows:

an operating system 614;
an installation package 110;
an installer 112;
an I/O manager 114;
an anti-malware driver 126;
a trust list 128;
trust reputation information 130;
a persistent cache 118; and
various other applications and data 616.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A method implemented on a computer having at least one processor, comprising:
    detecting an installation process installing an installation package;
    during installation of the installation package by the installation process, analyzing whether a combination of the installation process and the installation package, as a pair, has a trust reputation without scanning the installation package for malware;
    upon determining that the combination of the installation process and the installation package, as a pair, have a trust reputation, intercepting the installation process installing a first file of the installation package to analyze whether a combination of the first file and the installation process, as a pair, has a trust reputation without scanning the first file for malware; and
    upon determining that the combination of the first file and the installation process as a pair has a trust reputation, storing an identity associated with the first file in a persistent cache, wherein the persistent cache includes identities of files having a trust reputation.

2. The method of claim 1, further comprising:
    determining the trust reputation of the installation package from a digital certificate associated with the installation package.

3. The method of claim 1, further comprising:
    determining the trust reputation of the installation package, the installation process, or the first file from trust reputation information obtained from a trust server.

4. The method of claim 1, further comprising:
    determining the trust reputation of the installation package, the installer, or the first file from a trust list associated with the computer.

5. The method of claim 1, further comprising:
    scanning the first file for malware when a trust reputation associated with the installation package and the installation process is deemed not trusted.

6. The method of claim 1, further comprising:
    scanning the first file for malware when a trust reputation associated with the installation package and the first file is deemed not trusted.

7. The method of claim 1, further comprising:
    prior to analyzing whether a combination of the first file and the installation process, as a pair, has a trust reputation, determining that a current installation process is same as the installation process deemed trusted or a process spawned from the installation process is deemed trusted.

8. A computer-readable storage device storing thereon processor-executable instructions that when executed on a processor performs the actions, comprising:
    detecting an installation process installing an installation package;
    during installation of the installation package, analyzing a combination of the installation process and the installation package, as a pair, for a trust reputation without scanning the installation package for malware;
    upon determining that the combination of the installation process and the installation package, as a pair, have a trust reputation, intercepting the installation process installing a first file of the installation package to analyze whether a combination of the first file and the installation process, as a pair, has a trust reputation without scanning the first file for malware; and
    upon determining that the combination of the first file and the installation process as a pair has a trust reputation, storing an identity associated with the first file in a persistent cache, wherein the persistent cache includes identities of files having a trust reputation.

9. The computer-readable storage device of claim 8, further comprising:
    determining the trust reputation of the installation package from a digital certificate associated with the installation package.

10. The computer-readable storage device of claim 8, further comprising:
    determining the trust reputation of the installation package, the installation process, or the first file from trust reputation information obtained from a trust server.

11. The computer-readable storage device of claim 8, further comprising:
    determining the trust reputation of the installation package, the installer, or the first file from a trust list associated with a computing device.

12. The computer-readable storage device of claim 8, further comprising:

scanning the first file for malware when a trust reputation associated with the installation package and the installation process is deemed not trusted.

13. The computer-readable storage device of claim 8, further comprising:
prior to analyzing whether the combination of the first file and the installation process, as a pair, has a trust reputation, determining that a current installation process is same as the installation process deemed trusted or a process spawned from the installation process is deemed trusted.

14. A system, comprising:
a processor and a memory;
a persistent cache storing identities of files deemed trusted; and
an anti-malware driver having instructions that when executed on a processor, interrupts an installation process installing an installation package to determine whether a combination of the installation process and the installation package, as a pair, are deemed trusted without scanning the installation package, and upon determination of the installation process and the installation package deemed trusted, intercepts installation of each file in the installation package to determine if the combination of the file being installed and the installation process, as a pair, are trusted without scanning the file being installed, and upon determination of the installation process and the file being installed are deemed trusted, places an identity associated with the file being installed in the persistent cache.

15. The system of claim 14, wherein the anti-malware driver includes instructions that when executed on a processor, prior to determining if the file being installed and the installation process are trusted, determines that a current installation process installing the file being installed is same as the installation process deemed trusted or spawned from the installation process deemed trusted.

16. The system of claim 14, wherein the anti-malware driver includes instructions that when executed on a processor, scans each file for malware when a trust reputation associated with the installation package and the installation process is deemed not trusted.

17. The system of claim 14, wherein the anti-malware driver includes instructions that when executed on a processor, scans each file for malware when a trust reputation associated with the installation package and the file is deemed not trusted.

18. The system of claim 14, wherein the anti-malware driver includes instructions that when executed on a processor, determines a trust reputation of the installation package, the installer, or each file from one or more of a trust list or a trust server.

19. The system of claim 14, wherein the anti-malware driver includes instructions that when executed on a processor, the anti-malware driver having further instructions that when executed on a processor sends file statistics to a trust server for each file stored in the persistent cache, the trust server storing trust reputations that is provided to the anti-malware driver.

20. The system of claim 19, wherein the trust server stores trust reputations received from other computing devices within the system.

* * * * *